United States Patent

[11] 3,601,338

[72] Inventor Masamichi Shigehara
 Yokohama-shi, Japan
[21] Appl. No. 775,605
[22] Filed Nov. 14, 1968
[45] Patented Aug. 24, 1971
[73] Assignee Tokyo Shibaura Electric Co., Ltd.
 Kawasaki-shi, Japan
[32] Priority Nov. 17, 1967, Nov. 17, 1967
[33] Japan
[31] 73605/67 and 73606/67

[54] APPARATUS FOR CONTROLLING THE ATTITUDE OF A SATELLITE
4 Claims, 8 Drawing Figs.

[52] U.S. Cl. .................................................. 244/1 SA
[51] Int. Cl. .................................................. B64g 1/00
[50] Field of Search ....................................... 244/1 SS

[56] References Cited
UNITED STATES PATENTS
3,168,263  2/1965  Kamm ........................ 244/1 SS
3,243,143  3/1966  Dickstein et al. ............ 244/1 SS
3,268,183  8/1966  Etkin ........................... 244/1 SS
3,282,532  11/1966 Tinling et al. ............... 244/1 SS
3,358,945  12/1967 Blount et al. ............... 244/1 SS
3,302,905  2/1967  Davis et al. ................. 244/1 SS
3,519,222  7/1970  Altekruse et al. ........... 244/1 SS Primary Examiner—Milton Buchler
Assistant Examiner—Jeffrey L. Forman
Attorney—Flynn & Frishauf ABSTRACT: An attitude-control apparatus for a satellite includes a main rod extending from the satellite body and having a weight at the outermost end thereof, and a rotatable damping rod supported on the satellite body. Damping control is effected by detecting the deflection of the satellite body from the standard direction in an inertial space thereby to vibrate the damping rod in the direction opposite to that of the deflection.

Direction to the Centre of the Earth

Orientation to Standard Direction in Inertial Space

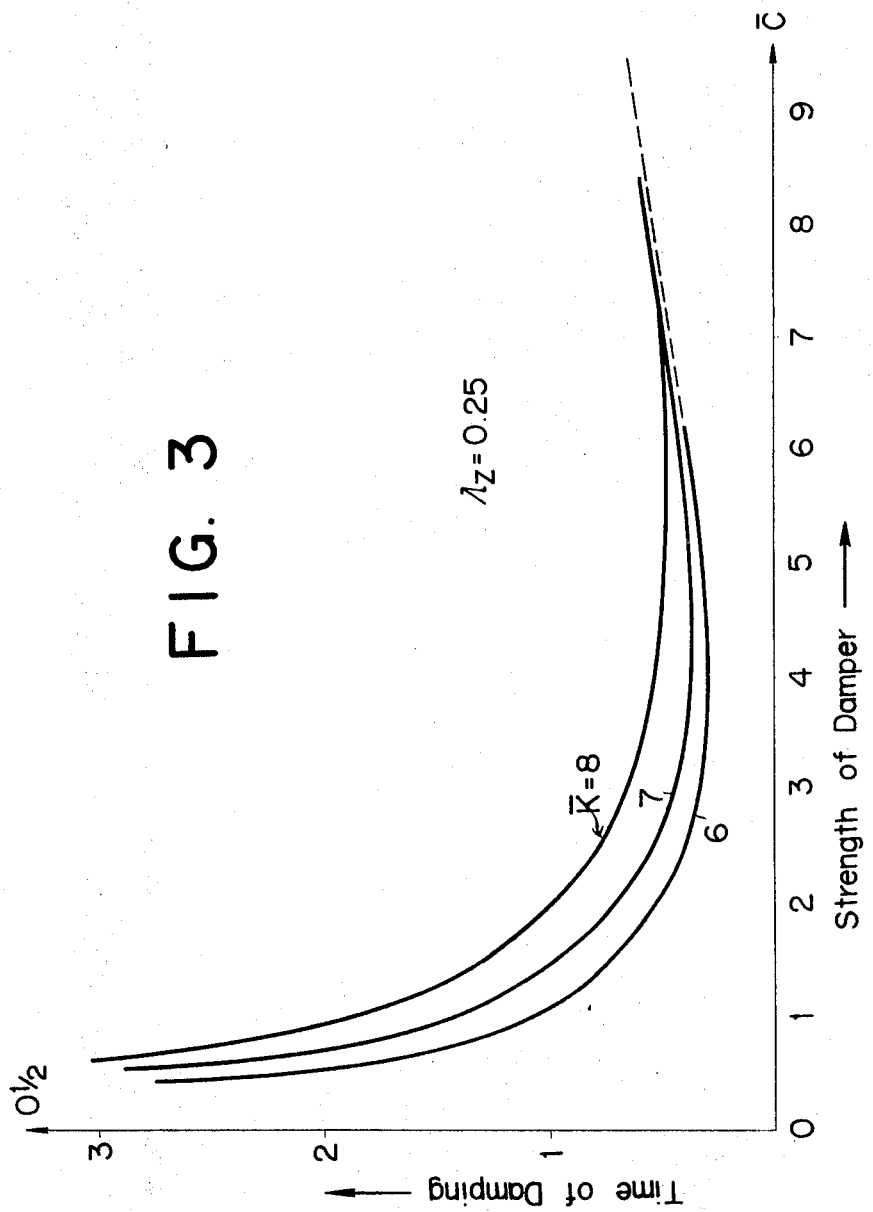

PATENTED AUG24 1971 3,601,338
SHEET 3 OF 3
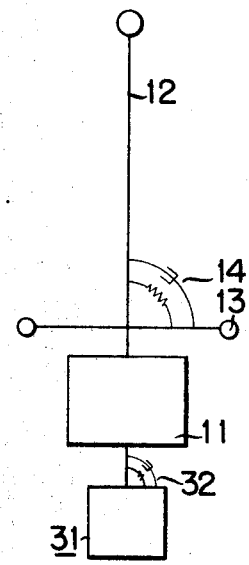
FIG. 6
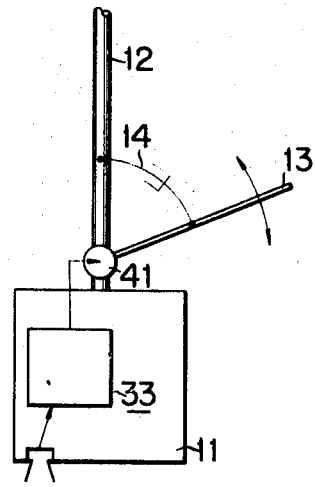
FIG. 8
FIG. 7
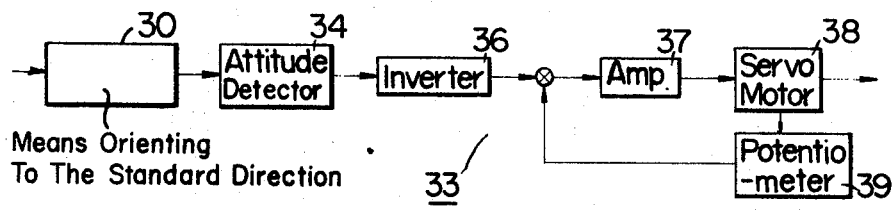

APPARATUS FOR CONTROLLING THE ATTITUDE OF A SATELLITE

The present invention relates to an apparatus for controlling the attitude of a satellite which has been improved in a damping effect, and more particularly to an apparatus for controlling the attitude of a satellite which is so arranged as to carry out effective damping even when the satellite displays wide vibrations.

It has been well known that it is possible to control the attitude of a satellite flying along its orbit so as to cause that axis of the satellite, around which the inertial moment is minimum, to be oriented to the center of the earth. With such method, when the control system itself starts vibrations under a given external disturbance, it is necessary to provide the system with a damping means for absorbing such vibrations. An example of the conventional control system comprises, as shown in FIG. 1, a main rod 2 and damping rod 3 attached to the body 1 of a satellite and a damping means 4 positioned between these rods 2 and 3. Namely, the damper hitherto used consisted of one orienting to the standard gravity direction in the gravity field, wherein there was set up a damping rod 3 substantially at right angles to the main rod 2, and between these rods was positioned a damper spring mechanism 4 thereby to absorb by the damping means the vibrations of the satellite body 1 in the form of relative vibrations between these rods 2 and 3.

In connection with the properties of the aforementioned apparatus of controlling the attitude of a satellite, there will now be described the orbital motion of the satellite by reference to the coordinate diagram of FIG. 2. A simplified equation of motion associated with an angle $\theta$ of deflection from the vertical direction (Z direction) of a satellite flying along a circular orbit and an angle $\alpha$ of rotation of the damping rod may be expressed as follows:

$$[S^2+3(1-2\lambda_z)]\cdot\theta+\lambda_z(S^2-3)\cdot\alpha=0$$
$$(S^2-3)\cdot\theta+(S^2+\bar{c}\cdot S+\bar{k}-3)\cdot\alpha=0 \quad (1)$$

where:
$S=d/d\tau$
$\tau=\Phi t$ ($\Phi$ represents the orbital angular velocity of a satellite)
$\lambda_z$ = a constant regarding the ratio of the inertial moment of a damping rod attached to the satellite to that of the satellite body
$\bar{c}$ = a proportional damping constant of a damper
$\bar{k}$ = a proportional spring constant of a damper (See "Proceeding of the Seventh International Symposium on Space Technology and Science," Tokyo, 1967, p. 619–625. "The System Performance and Analysis of the Gravity Gradient Stabilized Satellite," by Masamichi Shigehara.)

The above equation 1 of motion assumes a linear form. However, the application of this equation involves two assumptions, namely, that the satellite orbit is circular and that the angle $\theta$ of deflection from the equilibrium direction and the angle $\alpha$ of rotation of the damping rod 3 are extremely small. Namely, the control apparatus of the aforementioned type displays good linear damping properties with respect to the minute vibrations of the satellite on its orbit. However, where the orbital eccentricity becomes large or where its vibrations exhibit an unduly large amplitude, the above equation is not rigidly applicable. Accordingly, the aforementioned control system has the drawback that it does not display the good damping properties which would be expected if the conditions as assumed above should be satisfied. FIG. 3 illustrates an example of the relationship between the damping velocity of the control system and the strength $\bar{c}$ of the damper as derived from the above equation. In the figure, the value of $\bar{k}$ is set at 6, 7 and 8 in case of $\lambda_z=0.25$. As seen from said figure, a damper having a certain degree of $\bar{c}$ exhibits a maximum damping effect, but if the damper strength exceeds said degree there will be conversely reduced the damping effect. The reason is that since the aforesaid control system absorbs all the vibrations of a satellite in the form of relative vibrations between the two rods, too large a value of $c$ causes the two rods to be combined too rigidly to create their relative vibrations. Namely, with this control system, the increase of the damper strength did not always result in a good damping effect. Accordingly, where there was demanded a sufficiently great damping effect particularly to absorb wide satellite vibrations, there were encountered difficulties in designing a control system which would display a sufficiently great damping effect.

An object of the present invention is to provide an apparatus for controlling the attitude of a satellite equipped with a damper displaying effective damping properties even to large satellite vibrations.

Another object of the present invention is to provide an apparatus for controlling the attitude of a satellite equipped with a damper exhibiting effective damping properties even in case the eccentricity of the satellite orbit becomes large.

Still another object of the present invention is to provide an apparatus for controlling the attitude of a satellite equipped with a damper presenting desired damping properties to meet any large amplitude of satellite vibrations.

SUMMARY OF THE INVENTION

The present invention provides an apparatus for controlling the attitude of a satellite by detecting, when the satellite body is vibrated, the deflection of the satellite body from the standard direction in an inertial space. A damping rod is caused to move relatively to a main rod with an amplitude proportional to the deflection of the satellite body, thereby providing the required damping characteristics.

The present invention can be more fully understood from the following detailed description when taken in connection with the accompanying drawings, in which:

FIG. 3 shows the relationships of the strength versus damping velocity of a damper;

Figure 1:
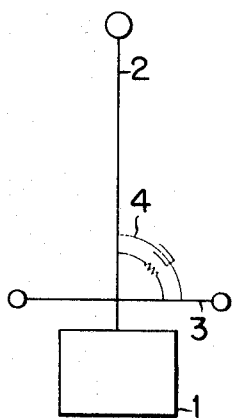
FIG. 1 illustrates the conventional system for controlling the attitude of a satellite.
Figure 2:
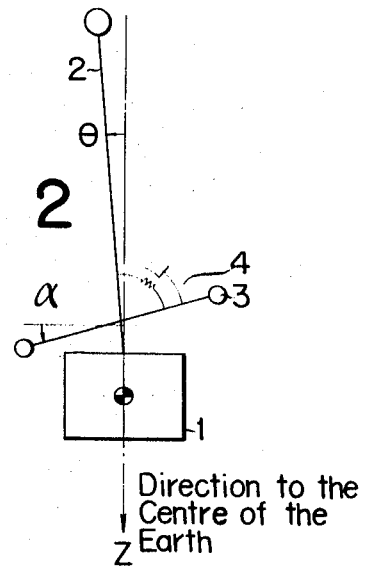
FIG. 2 is a coordinate diagram associated with satellite vibrations.
Figure 4:
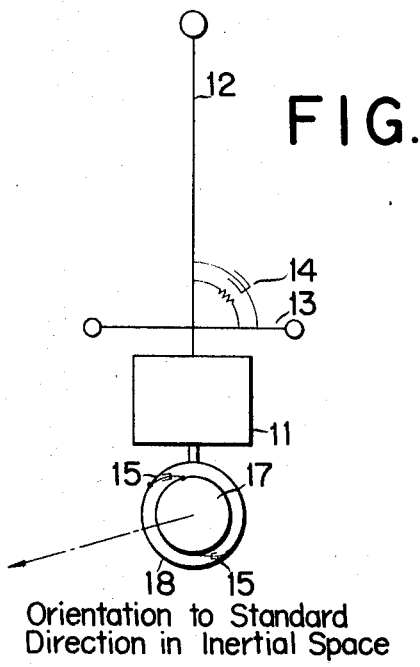
FIG. 4 represents an embodiment of the damping process of the present invention.
Figure 5:
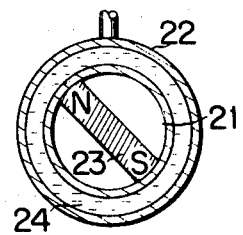

FIG. 5 indicates a platform assembly of FIG. 4;

FIG. 6 shows another type of platform assembly of FIG. 4;

FIG. 7 is a block diagram of a control circuit; and

FIG. 8 illustrates another embodiment of the present invention.

There will now be described an embodiment of the present invention by reference to the appended drawings. Referring first to FIG. 4 numeral 11, 12 and 13 respectively represent the satellite body, main rod and damping rod. Numeral 14 is a first damper making use of the gravity direction as a standard. Numeral 15 is a newly added second damper, and numeral 17 is a platform assembly fixedly orienting to a certain direction in an inertial space. Numeral 18 denotes a member to which the satellite body is attached. The second damper 15 and the attaching member 18 constitute a damping device. The vibrations of the satellite body lead to relative vibrations between the platform assembly 17 and satellite fixed member 18. Accordingly, if there is interposed a damper therebetween so as to absorb said relative vibrations, then there will be absorbed the energy of vibration. The relative vibrations involve substantially the same pattern in those of the satellite body. Accordingly, if there is set up a damper which is operable in proportion to the amplitude of vibrations, then there will be absorbed the vibration energy of the satellite body in proportion to the amplitude of its vibrations.

There may be contemplated various means for effecting damping so as to assure orientation to the standard gravity direction in an inertial space. By way of illustration, however, there is presented in FIG. 5 an example of these means, namely, a platform assembly always orienting to the standard direction in the terrestrial magnetic field. This platform assembly consists of an inner spherical member 21. The damping device is formed of a viscous damping fluid 24 and an outer spherical member 22 which houses the inner spherical member 21 in such a manner that a space is formed between the spherical member 21 and 22 and which is fixed to the satellite body so as to rotate in accordance with the vibrations of the satellite body. The inner sphere 21 is formed integrally with a permanent magnet 23. If the inner sphere 21 is locked in the direction of the terrestrial magnetic field and there occurs vibrations of the satellite body, then the vibrations of the satellite body cause relative vibrations to take place between the inner and outer spheres 21 and 22. Therefore, if a space between these sphere is filled with the viscous fluid 24 such as silicon oil, the platform assembly and the fluid 24 will act so as to absorb the vibration energy of the satellite body. Other embodiments of the platform assembly are shown in FIGS 6 and 7. Referring to FIG. 6, the platform assembly 31 is connected to the satellite body 11 and there is disposed a second damper 32 between the platform assembly 31 and satellite body 11.

As shown in FIG. 7, the platform assembly 31 includes a control circuit 33 and a means 30 orienting to the standard direction fixed in the inertial space. There is detected in an attitude detector 34 the angle $\beta$ of deflection of the platform assembly 31 from the standard direction fixed in an inertial space by using the output signal from the orienting means 30. Outputs from this detector are changed in gain and phase by a transducer 36 to be designated as $-k\beta$. The letter $k$ of this designation represents a proportional constant. Thereafter the detection output $k\beta$ is supplied through servoamplifier 37 to a servomotor 38. This motor controls the platform assembly 31 so as to cause it to orient to the standard direction in an inertial space. The voltage of outputs from the servomotor 38 is fed back to the input terminal of the servoamplifier 37 by operating a potentiometer. The devices orienting to the standard direction include a process using the aforesaid permanent magnet in assuring orientation to the standard direction in an inertial space, a process orienting to the direction to the sun using the pressure of radiations from the sun and a process of forming an inertial platform making use of the principle of a gyroscope. The means of detecting the standard direction include a sun sensor, horizon sensor, a magnetometer to detect the direction of the terrestrial magnetic field, star tracker, etc. The second dampers consist of various types, such as an ordinary mechanical damper, fluid damper, magnetic hysteresis loss damper, eddy current damper, etc.

On the other hand, with the conventional damping system for orientation to the standard gravity direction in an inertial space, common means presented difficulties in rigidly establishing a standard direction in an inertial space. Namely, it was difficult to provide a delicately operable damper capable of accurately responding to any minute vibrations of the satellite body. However, the attitude-control apparatus of the present invention has made it possible to carry out damping required over a wide range from the broad to the minute amplitude of satellite vibrations by joint use of two damping means, namely, that which is intended for orientation to the standard gravity direction in the gravity field and that for a certain direction fixed in an inertial space, by way of supplementing the drawbacks of these means.

There will now be described another embodiment of the present invention by reference to FIG. 8, which shows its basic arrangement. The satellite body 11 is provided with main and damping rods 12 and 13 and a damper 14. Further provided is the control circuit 33 shown in FIG. 7 and an attitude detector 34 attached to the satellite body 11.

To describe further, the damping rod 13 is so supported as to rotate relatively to the main rod 12. The support base of the damping rod 13 is provided with an actuator 41 for rotating said rod and if required, with a detector of rotation angles. The signals associated with the attitude of the satellite body detected by the detector 34 are allowed to pass through the control circuit 33. The output from the circuit 33 operates the actuator 41 thereby to cause the damping rod 13 to vibrate with the same frequency as that of satellite vibrations, at an amplitude proportional to that of satellite vibrations but in the opposite direction to that in which the satellite body 11 vibrates. With the angle of deflection of the satellite body from a vertical denoted by $\theta$, an output corresponding to the rotation angle $-k\theta$ defined by the satellite body with the damping rod 13 is taken out of the transducer 36 thereby to cause the actuator 41 to be driven by the servomotor 38. In this case $k$ denotes a proportional constant.

Where the satellite body 11 starts vibrations, the aforementioned embodiment of the attitude-control apparatus of the present invention causes relative vibrations to take place between the main and damping rods 12 and 13 at an amplitude proportional to that of satellite vibrations quite independently of the strength of a damper interposed between these rods. Accordingly, it will be possible to design a control apparatus capable of carrying out damping to any extent required for control of the satellite vibrations, if the damper 14 disposed between the main and damping rods 12 and 13 is allowed to have a suitable strength. A means 30 for orienting to the aforementioned standard direction in the gravity field or inertial space which is built in the attitude detector 34 attached to the satellite body 11 may consist of the same type as that used in the preceding embodiment of FIG. 4.

As mentioned above, the apparatus according to the embodiment of FIG. 8 for controlling the attitude of the satellite body using the gravity gradient torque is equipped with a detector of its attitude to carry out better damping and an efficient damper assembly comprising a damper and a member to be vibrated by an actuator in the opposite direction to that in which the satellite vibrates, thus providing excellent damping means for the control of the satellite attitude due to elevated damping properties.

The foregoing description relates to the motion of a satellite around its pitch axis. However, it will be apparent that the same principle of the present invention can be applied in damping the satellite motion around the roll and yaw axes in accordance with customary practice of analyzing a general flying body.

What is claimed is:
1. An apparatus for controlling the attitude of a satellite comprising:
   a satellite body (11);
   a main rod (12) fixedly coupled to and extending from the satellite body (11) and provided with a weight at the outermost end thereof to control the attitude of the satellite body using the gravity gradient torque;
   a damping rod (13) extending from the main rod (12) and movably connected thereto;
   an actuating means (41) coupled to said damping rod (13) for moving said damping rod (13) relative to said main rod (12);
   a damper (14) interposed between the main rod (12) and the damping rod (13);
   an attitude-detector means (34) for detecting the deflection angles of said satellite body (11) and of the main rod (12) from the standard direction in the inertial space independent of the position of said damping rod (13); and
   control means (36, 37, 38, 39) responsive to the output of said attitude-detector means (34) for driving said actuating means (41) to control said damping rod (13) to cause said damping rod (13) to rotate in a direction opposite to that which said satellite body (11) vibrates.
2. Apparatus according to claim 1 wherein said control means comprises:
   means (36) for changing the sign and gain of electrical outputs from said attitude detector (34) which correspond to the angles of deflection; and
   a servocontrol means (37, 38, 39) for driving said actuating means (41) so as to rotate said damping rod (13) in said direction opposite to that in which said satellite body (11) vibrates.
3. Apparatus according to claim 1 wherein said attitude detector (34) includes a horizon sensor.
4. Apparatus according to claim 1 wherein said attitude detector (34) includes a sun sensor.